United States Patent [19]

Ulyanov et al.

[11] 4,055,216
[45] Oct. 25, 1977

[54] VACUUM CASTING MACHINE

[76] Inventors: Viktor Leonidovich Ulyanov, ulitsa Semashko, 21, kv. 78; Eduard Evgenievich Shishkarev, ulitsa Bereznyakovskaya, 24, kv. 10; Valentin Vasilievich Nazarenko, Mikhailovsky pereulok, 20, kv. 12,, all of, Kiev, U.S.S.R.; Vladimir Efimovich Yavich, deceased, late of Kiev, U.S.S.R.; by Maria Semenovna Yavich, administrator, ulitsa Serova, 33, kv. 20, Kiev, U.S.S.R.

[21] Appl. No.: 736,360

[22] Filed: Oct. 28, 1976

Related U.S. Application Data

[63] Continuation of Ser. No. 664,076, March 5, 1976, abandoned, which is a continuation of Ser. No. 542,703, Jan. 21, 1975, abandoned.

[51] Int. Cl.² .................. B22D 27/16; B22D 13/00
[52] U.S. Cl. ........................ 164/258; 164/65; 164/296; 164/326
[58] Field of Search .............. 164/65, 254, 256, 258, 164/286, 296, 326

[56] References Cited

U.S. PATENT DOCUMENTS

| 2,292,598 | 8/1942 | Batie | 164/296 X |
| 2,825,945 | 3/1958 | Ulrech et al. | 164/258 |
| 3,807,488 | 4/1974 | Glazunov et al. | 164/258 X |

FOREIGN PATENT DOCUMENTS

| 643,736 | 6/1962 | Canada | 164/258 |
| 212,289 | 5/1968 | U.S.S.R. | 164/252 |

Primary Examiner—Ronald J. Shore
Assistant Examiner—Gus T. Hampilos
Attorney, Agent, or Firm—Holman & Stern

[57] ABSTRACT

A vacuum casting machine has a rotary table obtaining motion from a self-contained drive and accommodating chambers with casting molds. In turning, the rotary table causes each of the chambers to register in succession with an opening in a melting chamber through which metal is being poured. This arrangement of mold chambers enables partial overlapping in time of such processes as preparing a mold for pouring, the melting of charge and accumulating melt in the melting chamber in a requisite amount, and the cooling of each mold with the casting. This all considerably increases the production rate of the machine.

6 Claims, 10 Drawing Figures

VACUUM CASTING MACHINE

This is a continuation of application Ser. No. 664,076, filed Mar. 5, 1976, now abandoned, which in turn is a Rule 60 continuation of Ser. No. 542,703, filed Jan. 21, 1975, now abandoned.

BACKGROUND OF THE INVENTION

The present invention relates to the equipment for melting and casting metal in a vacuum, and more specifically to vacuum casting machines. It may be used to advantage in vacuum metallurgy employing electric furnaces where the operation of preparing the molds for casting and cooling of the castings is a rather time-consuming one. The most expedient way of using the invention is the incorporation of the machine disclosed into an electron beam melting plant producing castings predominantly in refractory and chemically-active metals, such as, for example, tungsten, tantalum, molybdenum, niobium, titanium, and their alloys.

There is known a vacuum casting machine comprising a metal-melting vessel disposed in a melting chamber fitted with means of heating the metal and a vacuum seal serving to close an opening through which the metal is being poured, a casting mold accommodated in a chamber of its own so arranged that an opening in this chamber in fact registers with the opening in the melting chamber, and a system for evacuating both the melting chamber and the chamber with the mold (USSR author's certificate No. 212,289).

The known machine serves the purpose of melting metal and is capable of heating the casting mold to approximately 1000° C accompanied by the degassing of the material it is made of followed by the centrifugal casting of metal in the mold and cooling of the casting to between 200° and 400° C, all these operations being performed in a vacuum.

In the known machine the melting chamber is accommodated on supports and is a water-cooled vessel with heaters for the melting of metal in the form, for example, of consumable electrodes producing an arc. The vessel is connected to a vapor pour pump. One of the walls of the vessel is provided with a manhole used for servicing the items of equipment installed in the vessel. This manhole is tightly closed when a vacuum is applied to the vessel.

Rigidly attached at the bottom of melting chamber is a dome-shaped shell arranged so that its convex side faces the inside of chamber and provided with a centrally-located operating closed by a vacuum seal. The edge of shell extends beyond the chamber and forms a pipe which has a flange for connecting the chamber containing the mold. The space inside the shell is connected to a vacuum pumping system.

The metal-melting vessel accommodated in the melting chamber is a water-cooled crucible provided with means of pouring the metal into the mold. Said means incorporates a shaft attached to the crucible with one of its ends whereas the other end extends through a vacuum seal beyond the melting chamber and is linked up with a self-contained drive. Installed in the melting chamber is also a funnel which both forms and directs the spout of molten metal as the metal is being poured into the mold. During this operation the funnel is inserted into the opening in the dome-shaped shell.

The casting mold is disposed in a separate chamber fitted with a flange for connecting to the flange of dome-shaped shell so that the shell and said chamber form a space separated from both the atmosphere and the space of melting chamber.

The mold-containing chamber is installed on a carriage and is capable of travelling with respect to the melting chamber along rectilinear rails placed under the melting chamber. Since the mold somewhat protrudes above the flange of its chamber, the carriage is fitted with jacks serving to move the mold-containing chamber vertically so as to connect its flange to the flange of dome-shaped shell.

For employing the centrifugal casting process, the casting mold is held fast to a base plate provided at the bottom of mold containing chamber. The base plate is attached to the end face of a shaft extending beyond the chamber by means of a vacuum seal. Fitted to the outside end of the shaft is a pulley linked up with an electric motor through a V-belt drive. The motor is installed on the carriage. The chamber is also fitted with heaters serving to heat the mold.

The known vacuum casting machine is provided with a self-contained vacuum pumping system serving to evacuate both the melting chamber and mould-containing chamber.

The vacuum pumping system of the melting chamber is a two stage one consisting of a high-vacuum vapor pump coupled to the melting chamber through a vacuum seal and a rough-vacuum mechanical pump producing a backing vacuum for the vapor pump.

The vacuum pumping system of the mold chamber is a single-stage one consisting of a rough-vacuum mechanical pump connected to the space inside the dome-shaped shell through a line because the mold chamber can be evacuated of air only if its flange is coupled to the flange of dome-shaped shell. All joints of the casting machine are provided with seals.

By the term high-vacuum pump as employed herein is meant a pump able to produce a pressure not below $5 \times 10^{-3}$ mm Hg whereas the term rough-vacuum pump denotes a pump ensuring a pressure of up to $1 \times 10^{-2}$ mm Hg. Said pumps maintain the requisite vacuum in the spaces evacuated throughout the operation.

The machine operates on the following lines. On sealing and evacuating the space of melting chamber, a casting mold is placed into the carriage-mounted chamber and secured to the base plate. The carriage is moved along the rails under the melting chamber so as to place the flange of mold chamber coaxially with the flange of the dome-shaped shell of melting chamber. At the next stage, the mold chamber is lifted with the aid of jacks so as to enable said flanges to couple one to another. A sealing member interposed between the flanges is compressed, sealing off the space formed by the dome-shaped shell and mold chamber. The mould chamber vacuum system is set into operation, evacuating said space and after that heaters are turned on for heating the mold to a temperature of approximately 1000° C.

During the heating of mold, gases are gradually driven off the material of mold and to prevent the contamination of the space inside the melting chamber by said gases the vacuum seal in the opening of dome-shaped shell is closed before setting the mold chamber vacuum system into operation. The mechanical vacuum pump of said vacuum system removes the gases as they are being liberated from the material of mold. At the same time, the melting chamber vacuum system is set into operation.

On heating the mold to the temperature specified for the process, the rate of mold degassing slows down considerably, an increase in the vacuum in the dome-shaped shell indicating this condition. At this instant, the vacuum seal in the opening of dome-shaped shell is opened whereas the mold chamber vacuum system is disconnected and the vacuum in both the melting chamber and mold chamber is maintained with the aid of the high-vacuum vapor pump of the melting chamber vacuum system. A further increase in the vacuum brings about further degassing of the material of mold and an interval of time is required until this degassing is completed. After that a voltage is applied to the consumable electrodes and the melting of the charge, placed in advance into the melting vessel of the melting chamber, is started. When sufficient melt of specified chemical composition is accumulated in the melting vessel, a funnel serving to protect the vacuum seal from splashes and direct the spout of melt into the casting mold is inserted into the opening in the dome-shaped shell. To produce castings by the centrifugal casting process, the drive of the base plate shaft is set into operation with the casting mold secured to said base plate. The electrodes are removed from the melting zone and deenergized, and the pouring arrangement is set into operation to pour the mold.

On completing the pouring, the funnel is returned into its original position and the casting in the mold is cooled to a temperature at which the gases of the atmosphere have no harmful effect on the material of the casting. The cooling takes place in a vacuum, i.e., the mold chamber remains connected to the melting chamber.

During the process of cooling, the vacuum in mold chamber is maintained with the aid of the vapor pump of melting chamber; alternatively, if the vacuum seal in the dome-shaped shell is closed, the vacuum is produced by the mechanical pump of the mold chamber vacuum system. If necessary, the casting can be cooled under a blanket of an inert gas pumped into the dome-shaped shell while the vacuum seal is being closed.

On finishing with the cooling of casting, the mold chamber is lowered onto the carriage with the aid of jacks and wheeled out from under the melting chamber along the rails. After that, the mold with the casting is removed from the base plate to which it is held down and withdrawn from the chamber. A new mold is placed into the chamber and the cycle is repeated.

It will be noted that the known vacuum casting machine operates in several stages which are: the placing of the mold on, and securing to, the base plate in the chamber accommodated on the carriage; the wheeling of the carriage with the chamber under the melting chamber and coupling the mold chamber to the melting chamber in a vacuum-tight fashion; the heating of the mould and the degassing of mold material with the rough-vacuum pump set into operation; the final degassing of mold material with the vacuum seal in the dome-shaped shell held open and the evacuation of both the melting chamber and mold chamber with the aid of the high-vacuum pump; the melting of charge and pouring of the mold; the cooling of the casting; the disconnection of the mold chamber from the melting chamber and the wheeling of the carriage from under the melting chamber for the purpose of removing the casting.

The machine may feature more than one carriage with mold chambers. In this case there is a practical possibility to overlap in time to some extent the operations of removing the mold with cooled-down casting and of coupling a new chamber with a mold to the melting chamber.

The known vacuum casting machine suffers from a number of drawbacks, one of them being the fact that the mold chamber is of a layout which enables the operations of mold heating and degassing of mold material and also that of cooling to take place only if the mold chamber is connected vacuum-tightly to the melting chamber (there is no other way of evacuating the mold chamber except through the dome-shaped shell of melting chamber). For the same reason, the casting is cooled also while the chambers are connected one to another in a vacuum-tight fashion or otherwise the gases of the atmosphere will have an adverse effect on the material of the casting.

The period elapsed in heating the mold and degassing its material and also that required for cooling the casting by far exceeds the melting time. While casting such metals as tungsten, tantalum, molybdenum and niobium, the mold should be heated to more than 1000° C and this heating along with the degassing of mould material takes over one hour. The process of final degassing is considerably extended in time if electron beam guns requiring a vacuum of the order of $1 \times 10^{-3}$ mm Hg in the melting chamber are used as the means of melting the metal.

The period elapsed in cooling such castings to a temperature between 200° and 400° C, which is regarded as harmless from the standpoint of illeffects of the gases of the atmosphere on the material of the casting, exceeds two hours and is selected depending on the size and shape of casting and also the material of mold. This is hardly comparable with some 30 to 40 minutes which are commonly required to obtain the requisite amount of melt in the melting vessel and so the operation of melting cannot be even partly overlapped in time by the operations of heating the mold and cooling the casting, said design features of the mold chamber being the cause of this disparity.

It stands thus to reason the production rate of the known machine is in fact decided by the duration of the period elapsed in time-consuming auxiliary operations of heating and degassing the mould and cooling the casting, and this is a disadvantage of the known machine.

Another disadvantage of the known machine is the fact that the mould chamber is of the non-split type, rendering the access to the base plate for securing the mould thereto difficult. Used commonly in such a chamber for holding down the mould is a contrivance clamping the mould due to the action of the centrifugal forces coming into play when the base plate is set spinning. Said contrivance fails to give reliable performance because it cannot prevent the mold from moving away from the centre of bed plate under the influence of radial forces coming into existence if the casting in the spinning mold becomes even slightly non-symmetrical.

OBJECTS AND SUMMARY OF THE INVENTION

It is an object of the present invention to eliminate said disadvantages.

Another object of the present invention is to provide a vacuum casting machine of a design which will considerably increase the production rate controlled by the period elapsed in obtaining the melt in a requisite amount and in pouring the mold.

A further object of the present invention is to provide a vacuum casting machine which is handy and reliable in operation.

Said objects are attained in a vacuum casting machine comprising a metal-melting vessel disposed in a melting chamber equipped with means of heating the metal and a vacuum seal serving to close an opening through which the metal is being poured, a casting mold disposed in a chamber of its own arranged so that its opening in fact registers with the opening in the melting chamber and a system for evacuating both the melting chamber and mold chamber, said machine incorporating according to the invention a rotary table with a self-contained drive and mold chambers rigidly attached to the table all the way around its circumference and each fitted with a vacuum seal; said rotary table places in turning each of the mold chambers in communication with the opening in the melting chamber whose vacuum seal connects to the vacuum seal of each of the mold chambers in a vacuum-tight fashion through a vacuum seal while the metal is being poured into the mold.

The present invention allows preparing the next mold for pouring at the same time that instant the current melting is finished and additionally allows the cooling of the casting simultaneously with the melting of the next charge and preparing the next mold disposed in its chamber on the rotary table. In addition, there is no need to place the mold chambers under the melting chamber in strict succession one after another; this, in its turn, allows the variation, in the case such necessity does not exist, of the period of preparing each of the molds for pouring depending on the weight of casting and, consequently, allows variations in the time of the cooling of the castings without interfering with the procedure of preparing the next batch of melt in the melting chamber.

It is expedient that the mold chambers are provided each with a second opening accommodating a vacuum seal for coupling the chamber to a pump additionally provided in said system for evacuation and installed on the rotary table. The provision of a vacuum pump on the rotary table and the fact that this pump can be connected to each of the chambers allow evacuation of the chambers to a vacuum of the same order as the vacuum produced in the melting chamber so that the gases driven off the material of molds when each of the mould chambers is vacuum-tightly linked to the melting chamber cannot contaminate the space of melting chamber.

In an embodiment of the present invention, the pump installed on the rotary table is connected to a line of preliminary vacuum through lines so that the lengths of lines adjacent to the joints are disposed along the axis about which the table is rotating. Such a connection between movable and fixed lengths of lines has proved its reliability over a long period in service.

In another embodiment of the present invention, each of the mold chambers is fitted with a base plate accommodating the mold, rigidly secured thereto, and attached to the end face of a shaft extending beyond the chamber and receiving rotary motion from a stationary drive enabling the centrifugal casting of metal to take place. Owing to this arrangement there is only one drive serving the needs of all the mold chambers provided on the rotary table.

In a further embodiment of the invention, each mold chamber is of the split construction and consequently can be split along a plane running close to the junction between the mold and base plate; furthermore, the rotary table is provided with an opening of a diameter which somewhat exceeds the diameter of that portion of chamber which accommodates the base plate with mold and is adapted for removal. On removing this portion of the chamber with the base plate and there is free access to the means of securing the mold to the base plate and the mould can be firmly secured in place.

Still in another embodiment of the present invention, the removable portion of chamber is provided with rollers at its bottom resting on circular rails disposed in a plane parallel to the rotary table and concentrically with the axis of its rotation, said rails being of split construction and installed so that a length of them is capable of moving in a vertical plane. By virtue of this arrangement, the parts of each chamber remain connected in a vacuum-tight fashion while the rotary table is on the move and, moreover, there is the capacity to mechanize the jobs of placing the mold into the chambers and withdrawing the mold integrally with the castings.

Thus, in the vacuum casting machine disclosed, the rotary table with the chambers mounted thereon enables both the preparation of each mold for pouring and the cooling of the mold with the casting without any connection between the mold chamber and melting chamber. By virtue of this fact, the production rate of machine is controlled mainly by the time required to melt a charge.

DETAILED DESCRIPTION OF PREFERRED EMBODIMENTS

The present invention will be best understood from the following detailed description of a preferred embodiment of the invention when this description is being read in conjunction with the accompanying drawings in which FIG. 1 is a plan view of the vacuum casting machine according to the invention;

FIG. 2-2' is a section on line II—II of FIG. 1;

FIG. 3 is a view of FIG. 2 in the direction of arrow G;

FIG. 4-4' is a sectional elevation of a mould chamber at the instant of pouring metal (a support 79 is shown turned so as to be superimposed over the plane of drawing);

Figure 2:
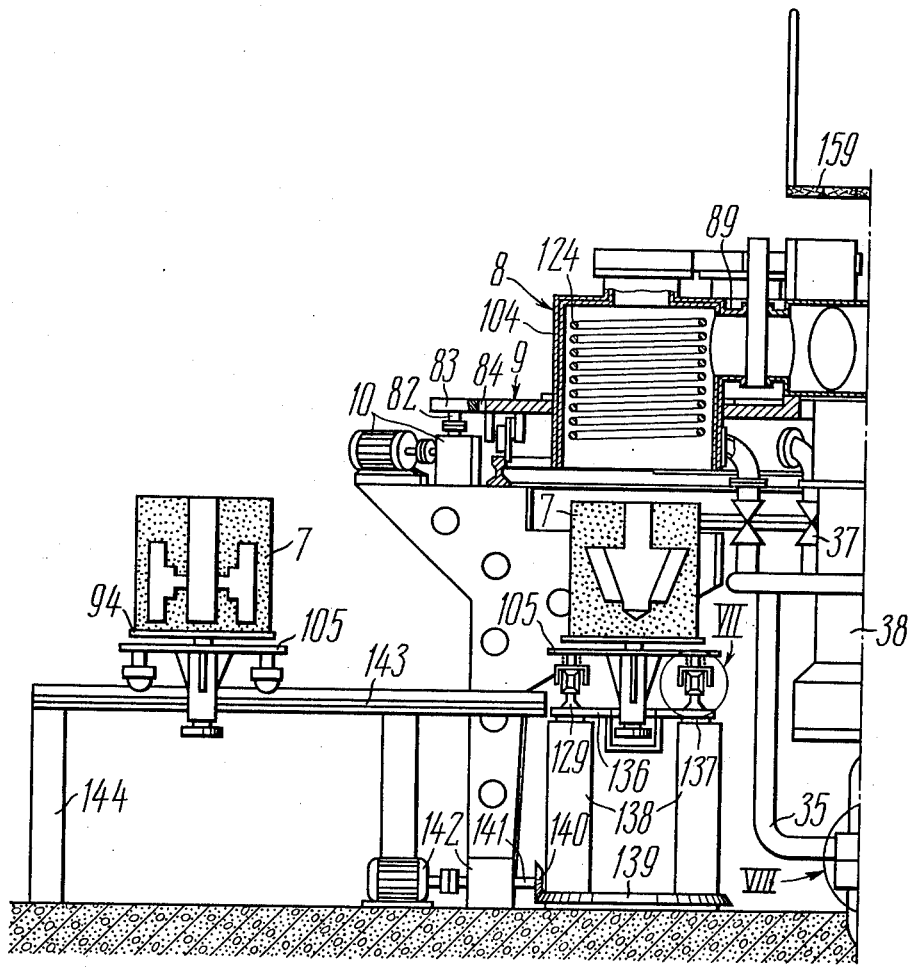
Figure 2:
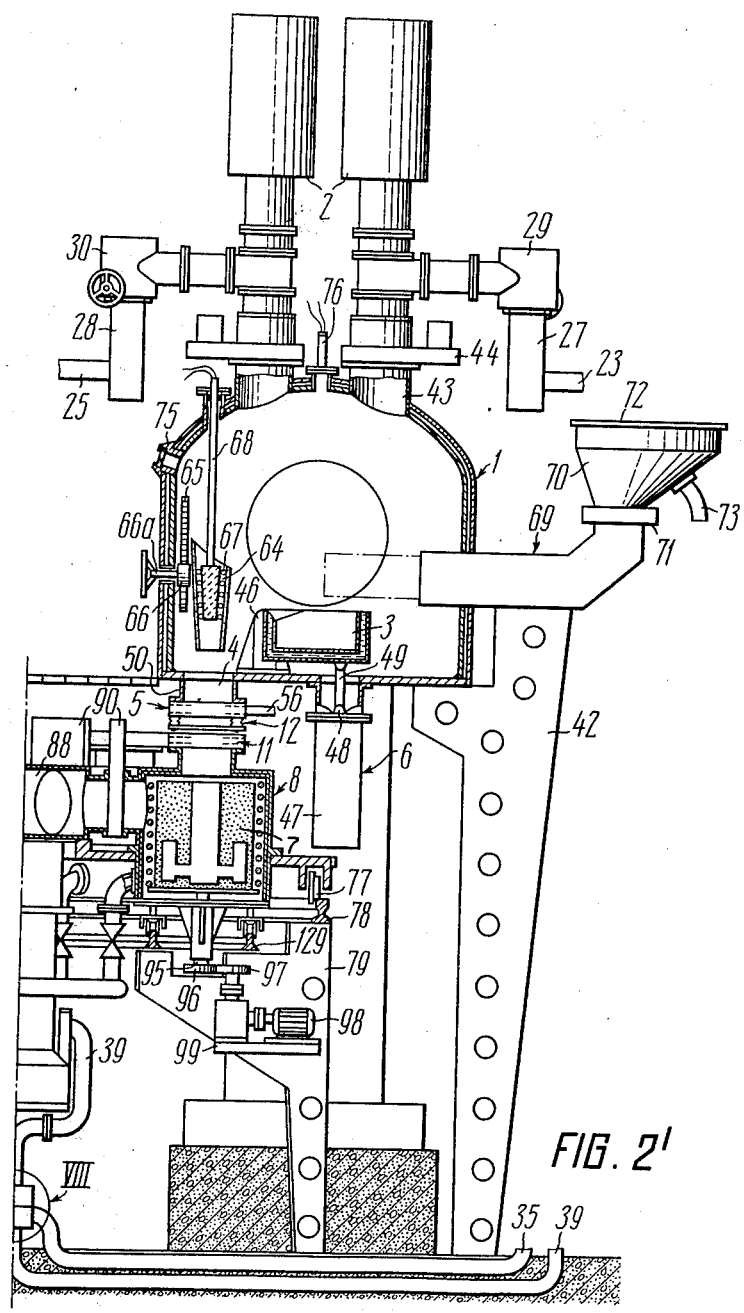
Figure 3:
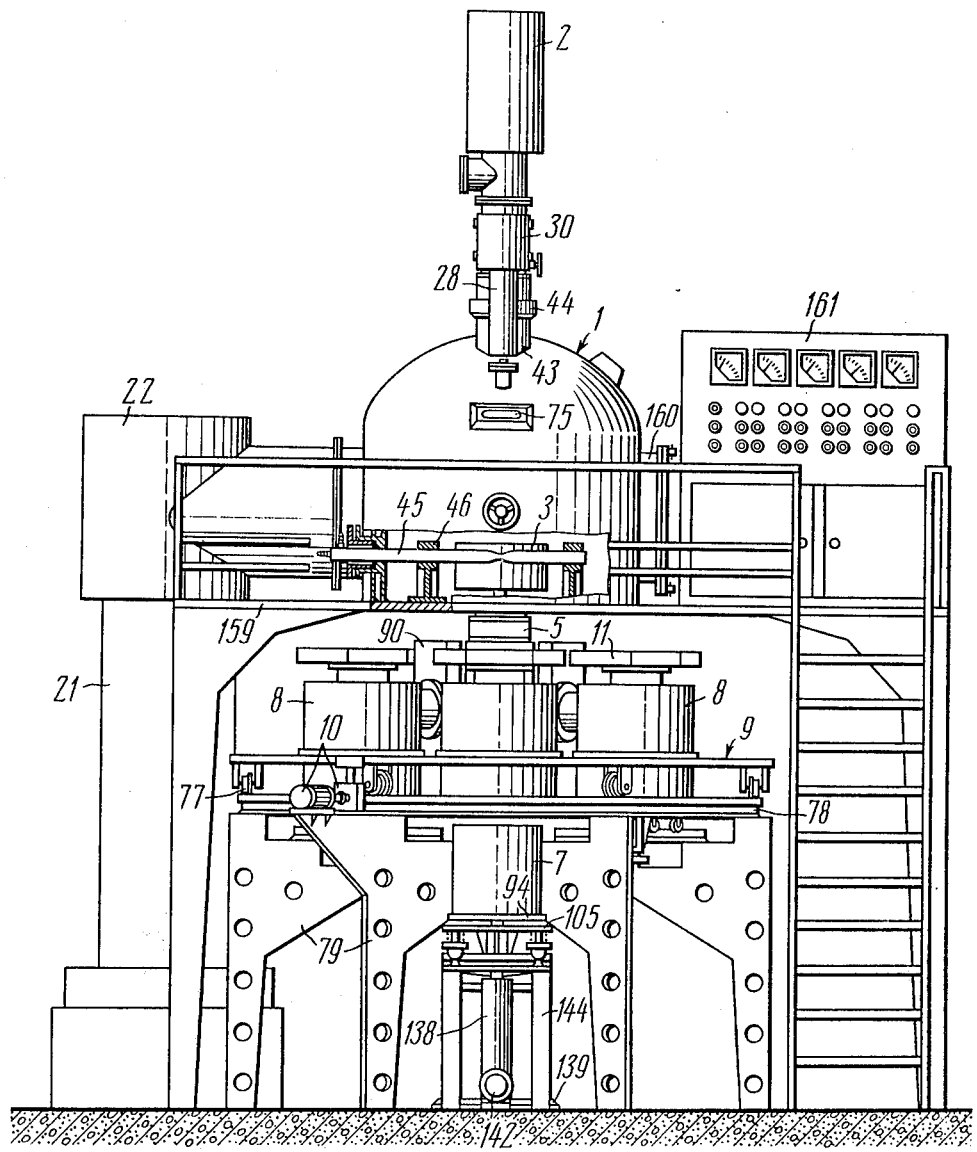

The vacuum casting machine disclosed serves the purpose of casting predominantly refractory and chemically active metals and their alloys. It incorporates a melting chamber 1 (FIG. 1) with electron beam guns 2 thereon for the purpose of melting metal. Accommodated in the melting chamber 1 is a vessel 3 (FIG. 2) wherein metal is being melted. For pouring the metal the wall of the chamber 1 is provided with an opening 4 closed by a vacuum seal 5. The melting chamber 1 contains a pouring means 6 for pouring metal into a casting mould 7 placed in a mold chamber 8. The vacuum casting machine according to the invention is provided with a rotary table 9 obtaining motion from a self-contained drive 10 (FIG. 3). Rigidly secured to the rotary table 9 all the way around its circumference is a plurality of chambers 8 (FIGS. 1, 2 and 3) each of which is provided with an opening with a vacuum lock 11 serving the purpose of in a, vacuum-tight fashion, the chamber 8 to the vacuum lock 5 (FIG. 2) of the melting chamber 1 when the mold 7 is being filled. The vacuum seals 5 and 11 are linked up vacuum-tightly one with another by means of a vacuum seal 12.

The machine is provided with a system for evacuating the melting chamber 1, mold chambers 8 and electron beam guns 2.

The system serving to evacuate the melting chamber 1 and electron beam guns 2 incorporates a rough-vacuum mechanical pump 13 (FIG. 1) which is capable of producing a pressure of the order of $1 \times 10^{-1}$ mm Hg. The pump 13 is connected to a receiver 16 through a line 14 with a valve 15 and the receiver 16, in its turn, is coupled to the melting chamber 1 through a line 17 with a valve 18. Line 19 with a valve 20 is connected to the receiver 16 thereby providing a link between a high-vacuum vapour pump 21 fitted with a vacuum seal 22 and to the melting chamber 1. The high vacuum vapor pump 21 is capable of evacuating said melting chamber to a pressure as low as from $1 \times 10^{-3}$ to $5 \times 10^{-5}$ mm Hg. In addition, the receiver 16 is connected to diffusion pumps 27 and 28 through a line 23 with a valve 24 and a line 25 with a valve 26, respectively. The diffusion pumps 27 and 28 provide a means of evacuation the space around the cathodes of the electron beam guns 2 to a pressure of approximately, $1 \times 10^{-5}$ mm Hg. Each of said pumps is equipped with a vacuum seal 29 and 30, respectively, for connecting the pumps to the respective electron beam guns 2.

To create a preliminary vacuum in the mold chambers 8 mounted on the rotary table 9, the vacuum pumping system also incorporates a mechanical pump 31 connected to a receiver 34 through a line 32 and valve 33, and the receiver 34, in its turn, is connected with the mold chambers 8 installed on the rotary table 9 through the intermediary of a line 35 and valve 36. Before entering each of the chambers 8, the line 35 (FIG. 2) is bifurcated and each branch is fitted with a valve 37.

Figure 1:
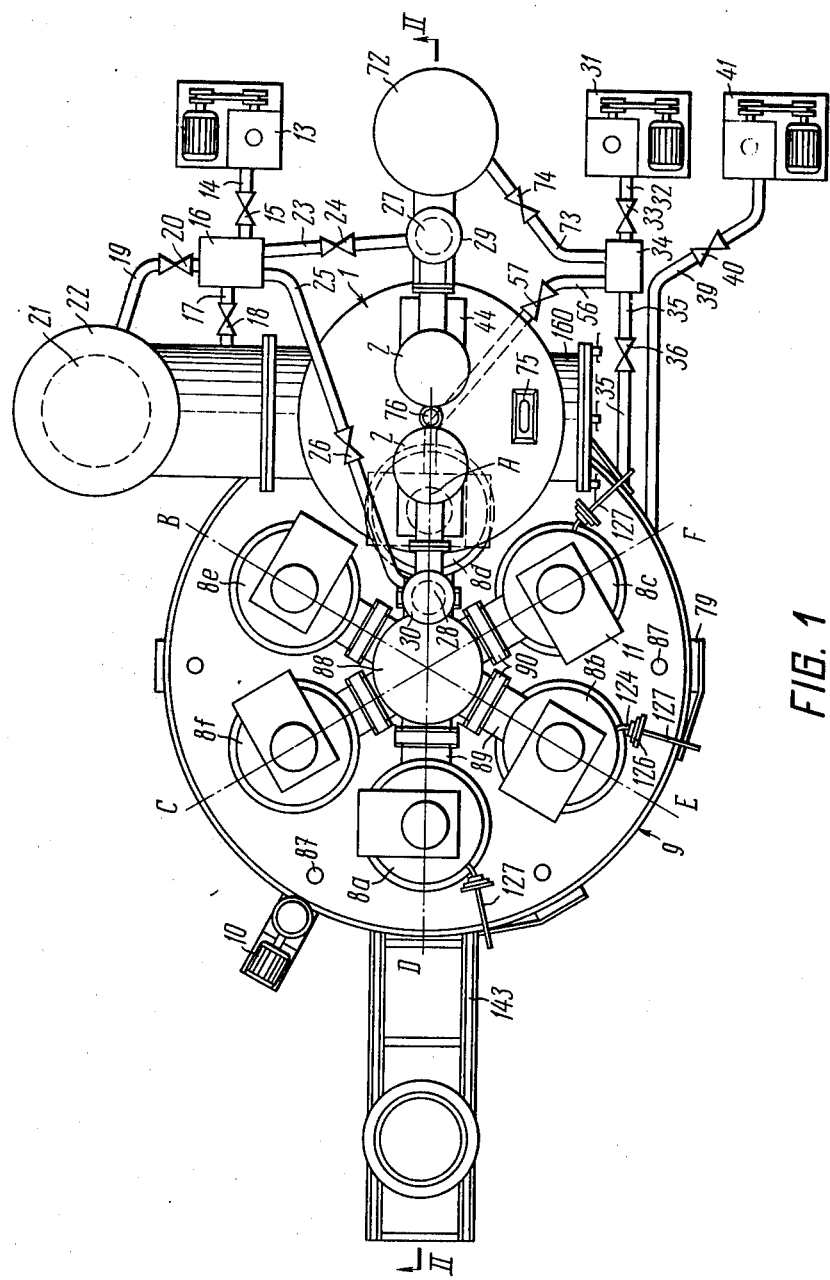

Disposed on the rotary table 9 is a vapor pump 38 additionally introduced into the vacuum pumping system and capable of producing a pressure of approximately $1 \times 10^{-3}$ mm Hg in the mold chambers 8. Said pump is coupled to a mechanical vacoum pump 41 through a line 39 with a valve 40 (FIG. 1).

The melting chamber 1 (FIG. 2) is a cylindrical water-cooled vessel of welded construction with a flat bottom installed on supports 42. Pipes 43 fitted into the holes at the top of the melting chamber 1 provide a connection with the electron beam guns 2 through vacuum seals 44. The vessel 3 disposed in the melting chamber 1 is a water-cooled lined crucible fitted to a horizontal shaft 45 (FIG. 3) extending with its other end beyond the melting chamber 1. The shaft 45 rest on brackets 46 with provision for rotation thereon and the brackets 46 are rigidly secured to the bottom of the melting chamber 1. The shaft 45 has drillings (not shown) admitted through which into the jacket of the vessel 3 is water for cooling and is an item of the pouring means 6 serving to pour the casting mould 7. Said pouring means also incorporates a hydraulic cylinder 47 attached outside the melting chamber 1 at its bottom at right angles to same so that a piston rod 48 of the hydraulic cylinder 47 enters the melting chamber 1 through a hole in its bottom and is pivotally linked with the vessel 3 by means of a tie rod 49. The bottom of the melting chamber 1 is also pierced by the opening 4 with a pipe 50 accommodated wherein is the vacuum seal 5.

The vacuum seal 5 consists of a hollow body 51 (FIG. 4) with an opening closed by a water-cooled cover 52 attached to a rod 53 whose other end extends beyond the body 51 so as to be capable of reciprocating back and forth integrally with the cover 52 in the direction coinciding with the direction of the longitudinal axis of the rod 53. The cover 52 has a boss pierced by a hole which enables the rod 53 to pass through the cover. Accommodated on that portion of the rod 53 which is inside said hole there is an eccentric 54 serving to hold down the cover 53 to a seal 55 disposed in the body 51 concentrically with the opening provided therein. The vacuum seal 11, 22, 29, 30 and 44 referred to above are of the same construction.

The space inside the body 51 communicates with the receiver 34 (FIG. 1) through a line 56 with a valve 57. The body 51 (FIG. 4) is fitted with a flange 58 disposed coaxially with the opening in the body and attached to said flange is the vacuum seal 12 comprising two coaxially arranged bellows 59 and 60 with a flange 61. The space between the bellows 59 and 60 communicates through a pipe 62 contacting the flange 58 with a source of liquid (not shown) kept under a pressure. The lower (as shown in the drawing) end face of the flange 61 is provided with an annular groove to accommodate a sealing ring 63.

Inside the melting chamber 1 (FIG. 2) in front of the opening in the body 51 (FIG. 4) of the vacuum lock 5 (FIG. 2) there is disposed a funnel 64 serving the purpose of directing the spout of metal into the casting mold 7 and protecting the locks 5 and 11 from splashings of molten metal. The funnel 64 is arranged in the melting chamber 1 with provision for reciprocating up and down along its axis by means of a rack 65 fitted to the tundish 64 and meshing a pinion 66 disposed at an end of a shaft 66a extending beyond the melting chamber 1 through a vacuum seal (not shown). Running coaxially with the tundish 64 inside the melting chamber 1 there is a heater fitted to an end of a rod whose other end extends beyond the melting chamber and serves to apply voltage to the heater 67. The length of the rod 68 is selected so that the upper portion of the tundish 64 embraces (as shown in the drawing) the heater 67.

The vessel 3 is charged from a hopper 70, using a feeder 69. The feeder 69 rests on the support 42 and a part of it extends into the melting chamber 1 through a side port. A vacuum seal 71 of a construction similar to that of the vacuum seal 5 (FIG. 4) is interposed between the hopper 70 and feeder 69. The feeder 69 (FIG. 2) is fitted with a telescopic screw which overhangs the vessel 3 during the operation of charging but is retracted into the feeder 69 during the operation of melting. The hopper 70 is provided with a lid 72 closing it in a vacuum-tight fashion. The hopper 70 is connected with the receiver 34 (FIG. 1) through a line 73 with a valve 74. An inspection window 75 (FIG. 2) in the melting chamber 1 enables the monitoring of the melting process. In addition, the temperature of the melt in the vessel 3 can be monitored by means of a transducer 76 available at the top of the melting chamber 1 as shown in the drawing.

The rotary table 9 (FIG. 1) of the vacuum casting machine is a horizontal plate resting on rollers 77 (FIGS. 2 and 3) fitted at its bottom as shown in the drawing all the way around the circumference and travelling over circular rails 78 accommodated on supports 79.

Spaced uniformly around the plate of the rotary table 9 (FIG. 1) there are openings each containing a chamber 8 with a casting mold 7. In an embodiment disclosed, the rotary table 9 carries six chambers 8. In general, the number of the mold chambers 8 accommodated on the rotary table 9 is decided by the ratio of the time elapsed in preparing a mold and cooling the casting contained therein to the time elapsed in preparing a next batch of melt in the vessel 3 for pouring another mold 7.

For fitting the mould chambers 8 into the openings of the rotary table 9, locating shoulder 80 is provided on the side surface of each chamber next to the mating side surface of opening (FIG. 4) and somewhat above the shoulder each chamber 8 has a flange made integrally with the chamber, said shoulder resting on the plate of the rotary table 9 and fixed to same by bolts (not shown). The rotary table 9 is so disposed with respect the melting chamber that in turning it enables the vacuum lock 11 of each mould chamber 8 to register with the vacuum lock 5 of the melting chamber 1.

The rotary table 9 is set into motion with the aid of the drive 10 (FIG. 3) accommodated on one of the supports 79. Fitted to an output shaft 82 (FIG. 2) of the drive 10 is a pinion 83 meshing a gear ring 84 attached to the side surface of the rotary table 9. For accurate positioning of the table 9 after it has been turned, use is made of an actuating cylinder 85 (FIG. 4) with a piston rod 86 arranged vertically and rigidly secured to one of the supports 79. Cylindrical through holes 87 provided in the plate of the rotary table 9 between the adjacent mold chambers 8 serve to accommodate the piston rod 86 of the cylinder 85. It will be noted that the support 79 is turned in FIG. 4 so as to be superimposed on the plane of drawing. The tip of the piston rod 86 is a conical one to facilitate the centering of each hole 87 in the table 9 with respect to the piston rod 86.

Each of the mould chambers 8 communicates with the vapor pump 38 (FIG. 2) attached to the rotary table 9 by way of an intermediate vessel 88 accommodated directly on the table 9. Each of the mold chambers 8 has a hole with a pipe 89 and a vacuum seal 90 of the same construction as the vacuum seal 5 (FIG. 4) considered above through which each of the mold chambers 8 is connected to the intermediate vessel 88 and, consequently, to the pump 38. The intermediate vessel 88 is fitted with pipes whose number corresponds to the number of mould chambers 8 available, each of these pipes being disposed coaxially with the pipe 89 of the corresponding mold chamber 8 on the other side of its vacuum seal 90 and serving to connect the intermediate vessel 88 to the corresponding mold chamber 8.

Should such necessity arise, each of the mold chambers 8 can be provided with a vacuum pump 91 (FIGS. 5 and 6) installed also on the rotary table 9 and serving only one said chamber. In this case, each such pump 91 is separated from the respective mold chamber 8 by a vacuum seal 92. For connecting each of the pumps 91 to the mechanical vacuum pump 41 (FIG. 1), the line 39 is bifurcated at the entry into each of the pumps 91 (FIG. 6) in the same way as the line 35 and each of the branches is fitted with a valve 93.

Each of the mold chambers 8 is a vessel of cylindrical shape cooled with water. For employing the centrifugal casting process, disposed in each chamber 8 is a base plate 94 attached to an end face of a shaft 95 extending beyond the mold chamber 8, said base plate accommodating one of the mold 7 rigidly secured thereto. Arranged at the opposite end of the shaft 95 is a gear 96 meshing a gear 97 (FIG. 2) of a drive 98 when the vacuum lock 11 of a mold chamber 8 is linked up with the vacuum lock 5 of the melting chamber 1. The drive 98 is a stationary one and is disposed on a platform 99 secured to the corresponding support 79.

Spaced equidistantly around the circumference of each base plate 94 there are cams 100 (FIG. 4) serving to hold the mould 7. This mold is also located in the central position by means of projections 101 arranged on the base plate 94 diametrically opposite each of the cams. Each of the cams 100 is disposed in a radial recess 102 of the base plate 94. Each recess is dovetailed in cross-section and provided with a tapped hole in its end face which accommodates a screw 103 also passing through a hole in the cam 100.

Each of the mold chambers 8 is of split construction and consists of an upper portion 104 as indicated on the drawing and a lower one shown at 105. The split is located in close proximity to the junction between the mold 7 and base plate 94. Said construction of the mold chamber 8 enables reliable securing of the mold 7 to the base plate 94. A point to be noted is that the diameter of the openings in the rotary table 9 somewhat exceeds that of that poriton 105 of the chamber 8 which accommodates the base plate 94 with the mold 7.

Each of the shafts 95 of the base plates 94 receives support from a bracket 106 which has a housing 107 made integrally with the lower portion 105 of the mould chamber 8. Fitted in the bore of the housing 107 is a journal bearing 108 and a journal thrust bearing 109. Interposed between the stationary races of the bearings 108 and 109 is a distance piece 110 and the static outside race of the bearing 109 is held in place by a flange 111 provided on the lower end face, as shown in the drawing, of the housing 107 accommodated on the bracket 106.

Each of the shafts 95 has a blind axial drilling provided with a partition 112 which runs diametrically along the geometrical axis of the shaft 95 and has a horizontal portion at its bottom as indicated in the drawing. Both parts of the drilling in the shaft 95 comminicate with the water jackets of the base plate 94 circulating through which is cooling water. The wall of the shaft 95 in close proximity of the horizontal portion of the partition 112 is pierced on both sides of the partition with holes 113 and 114. On the inside surface of the distance piece 110 level with said holes 113 and 114 there are provided annular grooves 115 and 116, respectively. Passing through the distance piece 110 level with the grooves 115 and 116 are radial tapped holes accommodating pipes 117 and 118, respectively, which, in their turn, pass through the housing 107 by way of an opening. Connected to each of the pipes 117 and 118 are flexible hoses 119, serving as the inlet and outlet for cooling water. To keep water out of the bearings 108 and 109 use is made of sealing rings 120 which are held down each by a flange 121 abutting against a step on the inside surface of the distance piece 110.

Interposed between the space inside each of the mold chambers 8 and the space inside the corresponding housing 107 of the bracket 106 is a cup 122 disposed in an annular recess machined in the upper portion of the housing 107 as indicated in the drawing coaxially with the opening. Each cup 122 is held down to the base of recess by a flange 123.

Each of the mold chambers 8 is equipped with a water-cooled induction coil 124 serving the purpose is heating-up the mold 7 and is attached to the inside of chamber. The leads from each induction coil 124 pass through a vacuum seal 125 inserted into an opening in a side wall of the upper portion 104 of the mold chamber 8 which remains stationary with respect to the rotary table 9. Contactors 126 accommodated on brackets 127 which are rigidly secured to supports 79 are provided for connecting the induction coils to a stationary source of power (not shown) after each turn of the rotary table 9.

Figure 7:
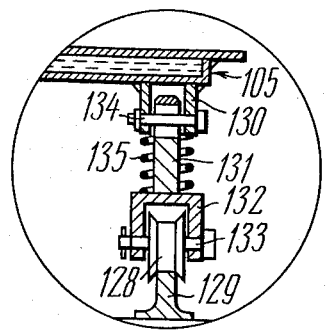
FIG. 7 is a view of fragment VII of FIG. 2b on an enlarged scale.

The lower separable portion 105 of each mold chamber 8 rests on rollers 128 (FIG. 7) arranged so that the axes of their rotation are parallel to the plane of the rotary table 9. The rollers 128 travel over circular rails 129 disposed in a plane parallel to the plane of the rotary table 9 concentrically with the axis of its rotation and serve the purpose of pressing the lower separable portion 105 of the mould chamber to the upper portion 104 and assuring tightness of the joint between said portions. The rails 129 rest on supports 79 (FIGS. 1 and 2).

Each of the rollers 128 is attached with the aid of a sleeve 130 secured to the bottom of the lower portion 105 (FIG. 7) of each mold chamber 8 with its end face and accommodating a rod 131 in its bore. Rigidly fitted to the other end of the rod 131 is a yoke 132 with a hole passing through which is a fulcrum pin 133 of the roller 128. That portion of the rod 131 which is inside the sleeve 130 is provided with an axially running rectangular slot inserted into which is a pin 134 whose ends rest in holes provided in the sleeve 130. A spring 135 is slipped on the rod 131 so that one of its ends comes abutting against the yoke 132 and the other against the end face of the sleeve 130. The attachment of the rollers 128 to the lower portion 105 of each mold chamber 8 (FIG. 2) allows to offset any inaccuracy in the disposition of the rails 78 and 129 one with respect to the other.

The lower portion 105 of each mold chamber 8 can be separated from the portion 104 of the same chamber for removing the mould 7 with a casting and replacing it by a new mold 7 by means of the rails 129 which are made up of sections installed so that one section can be moved vertically. This movable section of rails between two adjacent supports 79 is placed on a flat 136 resting, in its turn, on piston rods 137 of actuating cylinders 138. The cylinders 138 are disposed on a round turn table 139 given the shape of a truncated cone carrying a gear ring on its side surface. The gear ring meshes a gear 140 fitted to an output shaft 141 of a drive 142 intended to turn the turntable about its axis so as to register the section of the rails 129 arranged on the flat 136 with rectilinear rails 143 which are disposed radially with respect to the rotary table 9 at a height corresponding to the lowermost position of the flat 136. The rails 143 are accommodated on props 144 and serve the purpose of withdrawing the separable lower portion 105 of the mold chamber 8 integrally with the base plate 94 and the mold 7 resting thereon from under the rotary table 9 so as to make the mold 7 accessible.

Figure 4:
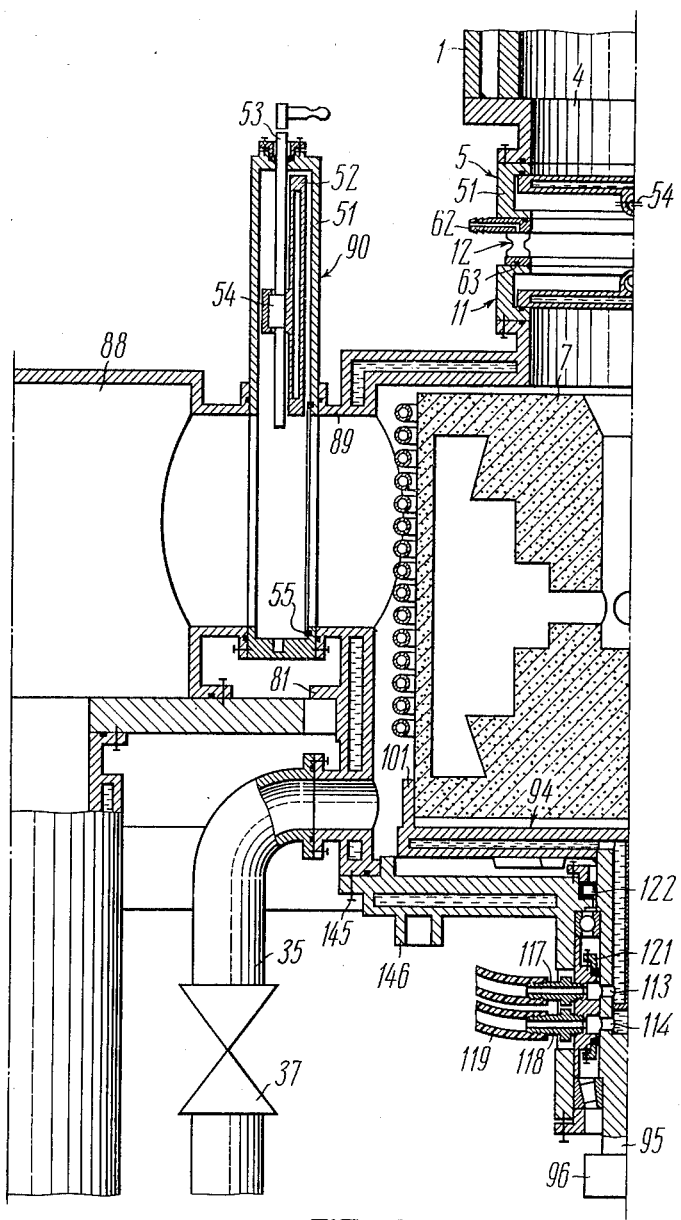
Figure 4:
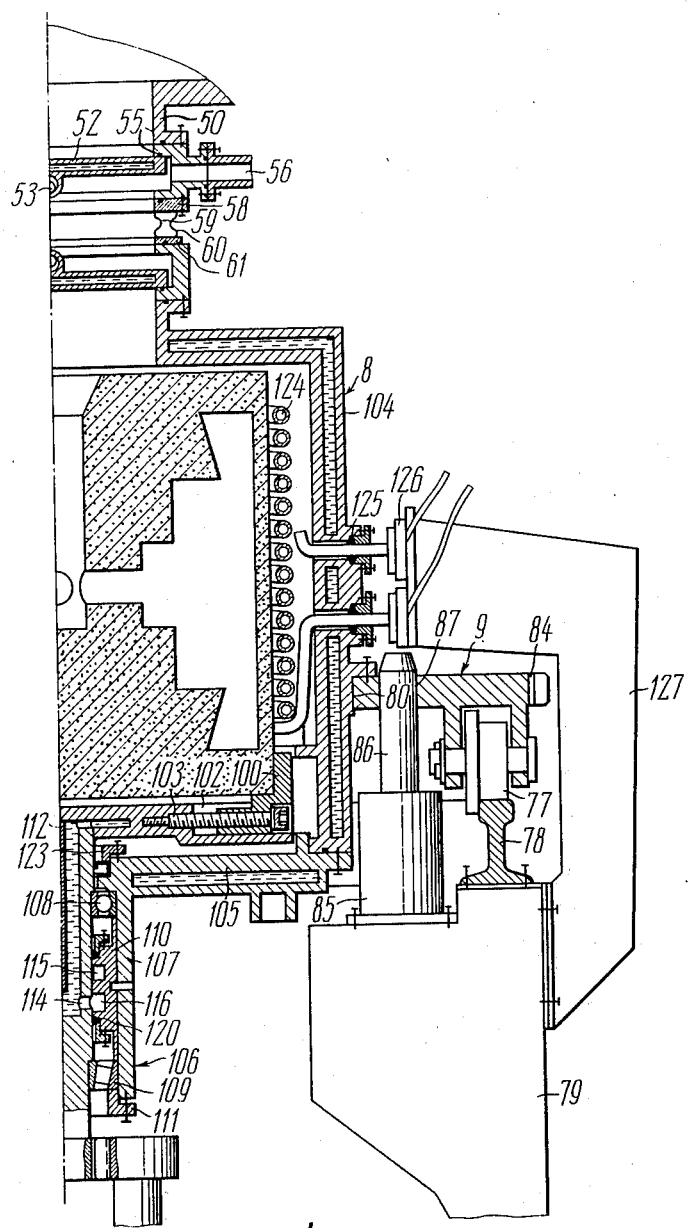

If each of the molds 7 and, consequently, the chambers 8 accommodating same are of comparatively small size, preference is given to split mould chambers of less intricate construction as indicated in FIG. 4. In each of said mold chambers 8, the joint between its portions 104 and 105 is rendered vacuum-tight with the aid of clamps 145 spaced equidistantly all the way around the circumference.

Serving the purpose of withdrawing the separable portion 105 of each mold chamber 8 integrally with the base plate 94 and mold 7 accommodated thereon, are sleeves 146 disposed vertically so as to contact the bottom of each separable portion 105 as indicated in FIG. 2 and contain the ends of the piston rods 137 of the actuating cylinders 138 in their bores.

Figure 8:
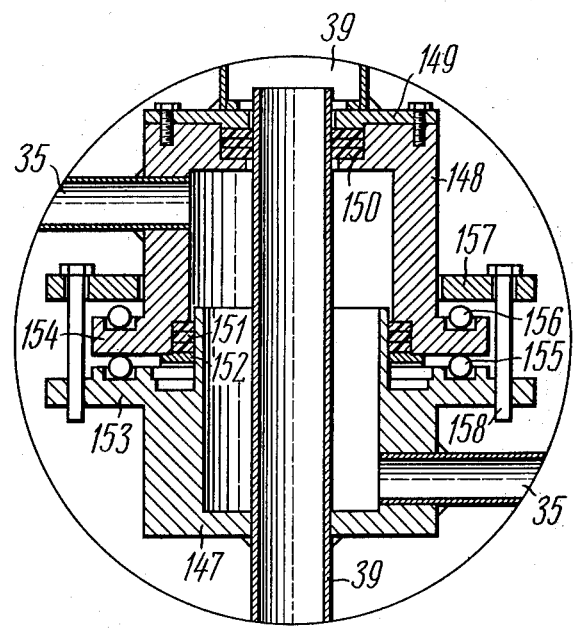
FIG. 8 is a view fragment VIII of FIG. 2 on an enlarged scale.

The pump 38 installed on the rotary table 9 is connected in accordance with the invention to the mechanical pump 41 (FIG. 1) through the line 38. Since the pumps 38 and mold chambers 8 move integrally with the rotary table 9 when said table turns, certain lengths of the line 35 serving to create a preliminary vacuum in the mold chambers 8 and also those of the line 39 also rotate with the table 9. Each of the joints between the moving and static lengths of the lines 35 and 39 is fitted with a coupling device shown in FIG. 8. It will be noted that the device consists of a static socket 147 and a movable socket 148 disposed coaxially and facing each other with their end faces. The sockets 147 and 148 are installed along the axis of rotation of the table 9. The bottom of the static socket 147 is pierced with a centrally located axial hole fitted into which is the static length of the line 39 also disposed along the axis of rotation of the table 9. The socket 147 is attached rigidly and vacuum-tightly to said length of the line 39. The bottom of the movable socket 148 is also provided with a centrally located axial hole and said length of the static line 39 extends into this hole without being attached thereto. The length of the line 39 rotating integrally with the table 9 is provided with a flange 149 rigidly secured to the end of the line. The flange 149, in its turn, is attached to the bottom of the movable socket 148 and is provided with a locating projection engaging a recess in the bottom of the socket 148. Also accommodated in said recess is a sealing ring 150 held down to the bottom of the recess and the side surface of the line 39 by a projection on the flange 149.

The static socket 147 is also provided with a side hole rigidly fitted wherein in a vacuum-tight fashion is the end of a static length of the line 35. The movable socket 148 is provided with a similar side hole fitted into which in the same way is the end of a rotating length of the line 35. The end face of the static socket 147 has a cylindrical projection which is a loose fit into the movable socket 148. An annular recess in the end face of the movable socket 148 accommodates a seal 151 embracing said cylindrical projection of the static socket 147. The seal 151 is held down to the bottom of the recess by a flange 152 attached to the end face of the socket 148.

Both the static socket 147 and movable socket 148 are provided with flanges 153 and 154, respectively, which are located in close proximity to the end faces of sockets. The upper end face of the flange 153, as shown in the drawing, has an annular groove disposed wherein is a plurality of balls 155 held down to the bottom of the groove by the end face of the flange 154. The upper end face of the flange 154, as shown in the drawing, has also an annular groove disposed wherein is a plurality of balls 156 held down to the bottom of the groove by a slip-on flange 157. Provided along the periphery of the flanges 153 and 157 are bolt holes fitted into which are hold-down bolts 158.

The vacuum casting machine is equipped with a service platform 159 (FIG. 3) arranged close to the melting chamber, which is provided with a service manhole 160. Accommodated on the service platform 159 is a control desk 161 with all the instruments and controls required for monitoring and controlling the process.

In the accompanying drawings the six mold chambers of the vacuum casting machine are designated as 8a, 8b, 8c, 8d, 8e and 8f, whereas the positions assumed by the mould chambers 8 in the course of the rotary movement of the table 9 are designated by the letters A, B, C, D, E, and F.

In the initial position preparatory to the operation as shown in FIGS. 1, 2 and 3, the mold chamber 8d is at A and the mold chamber 8a is at D where molds 7 are being placed into their respective chambers 8.

All the valves and vacuum seals are closed and the piston rod 48 of the hydraulic cylinder 47 is in its lowermost position. This indicates that the vessel 4 is placed so that its bottom is horizontal. The telescopic screw is retracted into the feeder 69 and the hopper 70 is free of the charge. The funnel 64 is in its uppermost position. The mold chambers 8 are free of the molds 7. The lower separable portion 105 of the mold chamber 8a integrally with the base plate 94 is on the rectilinear rails 143, the piston rods 137 of the actuating cylinders 138 are in their lowermost position along with the flat 136 and the section of the circular rails 129 disposed on the flat 136 register with the rails 143. The piston rod 86 of the actuating cylinder 85 is inserted into the hole 87 of the rotary table 9 between the mold chambers 8d and 8c.

Before starting operation, the cooling system is turned on followed by the mechanical vacuum pumps 13, 31 and 41 and then the valve 15, 20; 24, 26 and 40 are set open to provide backing vacuum for the vapor pumps 21, 27, 28 and 38. Also to be opened at this stage is the valve 18 of the melting chamber 1. If each of the mold chambers 8 is served by the vapour pump 91 of its own, also the valves 93 of each such pump are to be opened. Next to be opened are the vacuum seals 44 which connect the space of the electron beam guns 2 to the melting chamber 1. On attaining a pressure of around $1 \times 10^{-1}$ mm Hg in the spaces evacuated, the heaters of the vapor pumps 21, 27, 28 and 38 (91) are turned on, the heating-up of the oil in said pumps lasting between 30 and 45 minutes depending on the type of pumps and grade of oil used.

At the same time, a mold 7 is placed on the base plate 94 of the lower portion 105 of the mold chamber 8a disposed on the rectilinear rails 143. The mold 7 is centered on the base plate 94 with the aid of the projections 101 and held down by the cams 100, using the screws 103. The lower portion 105 of the mold chamber 8a with the mould 7 secured to its base plate 94 is moved along the rectilinear rails 143 so as to enable the rollers 128 to come on the section of the circular rails 129 disposed on the flat 136. On setting into motion the drive 142, the flat 136 with the section of the rails 129 is turned through 90° by means of the gear 140 which is in mesh with the gear ring of the turntable 139. As soon as compressed fluid is being applied to the actuating cylinders 138, the piston rods 137 of said cylinders start moving upwards so that the section of the rails 129 registers with the static section of said rails disposed on the supports 79.

While the movable section of the rails 129 registers with its static counterpart, the rods 131 move upwards with respect to the pins 134, the yokes 132 compress the springs 135 and the action of these springs transmitted through the sleeves 130 presses the lower portion 105 of the mold chamber 8a to the upper portion 104 so as to keep vacuum tight the joint between them.

If the mold chambers 8 are split as shown in FIG. 4, the lower portion 105 of the mold chamber 8a is pressed to the upper portion 104 in a vacuum-tight fashion by means of the clamps 145.

The valves 33, 36 and the valve 37 of the mold chamber 8a are opened in the succession indicated to place the space in the mold chamber into communication with the mechanical vacuum pump 31 through the line 35, receiver 34 and line 32, and to evacuate said chamber.

When the pressure in the mold chamber is approximately $1 \times 10^{-2}$ mm Hg, the contactors 126 fitted to the bracket 127 in close proximity to position D are energized, applying voltage to the leads of the induction coil 124 of the mold chamber 8a. The heating-up and degassing of the material of the mold 7 is started while the vacuum in the mold chamber 8a is being maintained by the mechanical vacuum pump 31.

A compressed fluid applied to the actuating cylinder 85 causes its piston rod 86 to move downwards so that the rod 86 disengages the hole 87 in the rotary table between the mold chambers 8d and 8e. On cutting in the drive 10 imparting rotary motion to the table 9 with the aid of the pinion 83 and gear ring 84, the table 9 starts rotating clockwise until the mold chamber 8a will move to the position E, being replaced by the chamber of arriving at D. If mold chambers of the layout illustrated in FIG. 1 are used, the piston rods 137 of the actuating cylinders 138 are withdrawn from the sleeves 146 preparatory to each turn of the table 9.

Temporarily interrupted while the rotary table 9 is on the move, the flow of current to the induction coil 124 of the mold chamber 8a is resumed as the chamber arrives at E where the leads of the induction coil 124 become connected to the contactors 126 fitted to the brackets 127 in close proximity to position E which become energized after the rotary table 9 completes its turn. The contactors 126 in proximity to position D are de-energized. Compressed fluid applied to the actuating cylinder 85 causes its piston rod 86 to move upards so as to enter the next hole 87 and locate the rotary table 9 in the requisite position.

Compressed fluid applied to the actuating cylinders 138 causes their piston rods to move downwards so that the section of the rails 129 disposed on the flat 136 also moves downwards until it is level with the rectilinear rails 143. The drive 142 is turned on and the flat 136 with the section of the rails 129 is turned through 90° so that the rails 129 register with the rails 143. The lower portion 105 of the mold chamber 8f is wheeled from under the rotary table 9 along the rails 143, a casting mold 7 is placed on the base plate 94 and then all the operations described above when dealing with the mold chamber 8a are repeated.

If use is made of mold chambers 8 of the layout shown in FIG. 4, the piston rods 137 of the cylinders 138 are inserted into the sleeves 146, the clamps 145 are screwn out, the lower portion 105 of the mold chamber 8f is lowered by means of the piston rods 137 and a mold 7 is placed on the base plate 94 of the chamber; the next operations are the same as in the case of the mold chamber 8a described above.

On rendering vacuum tight the joint between the portions 105 and 104 of the mold chamber 8f which is at D, the valve 37 of the mold chamber 8a positioned at E is closed and the vacuum seal 90 of said chamber is opened to provide connection to the vapor pump 38 through the intermediate vessel 88. For opening the vacuum seal 90, it is necessary to turn the rod 53 through 180 degrees about its axis so that the eccentric 54 attached thereto moves the cover 52 towards the axis of the opening it closes and away from the seal 55. The rod 53 (FIG. 4) is then moved upwards as shown in the drawing with the result that the cover 52 is also moved upwards, opening the opening that the cover 52 is also moved upwards, opening the opening in the body 51 of the vacuum seal 90.

Figure 6:
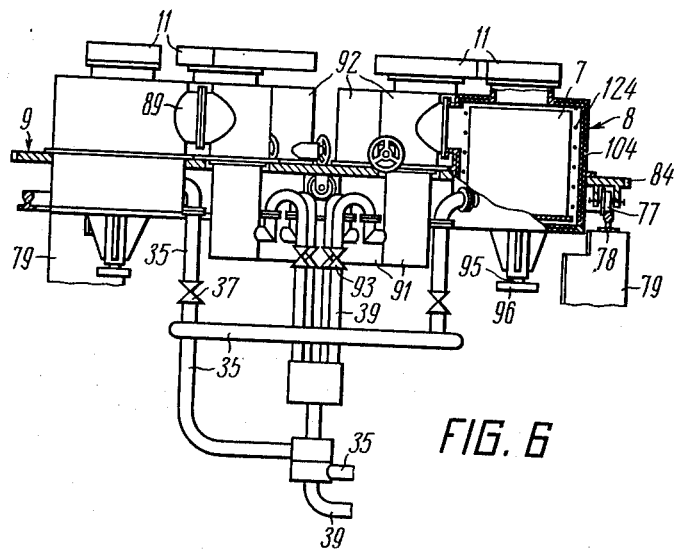
FIG. 6 is a section on line VI—VI of FIG. 5.
Figure 5:
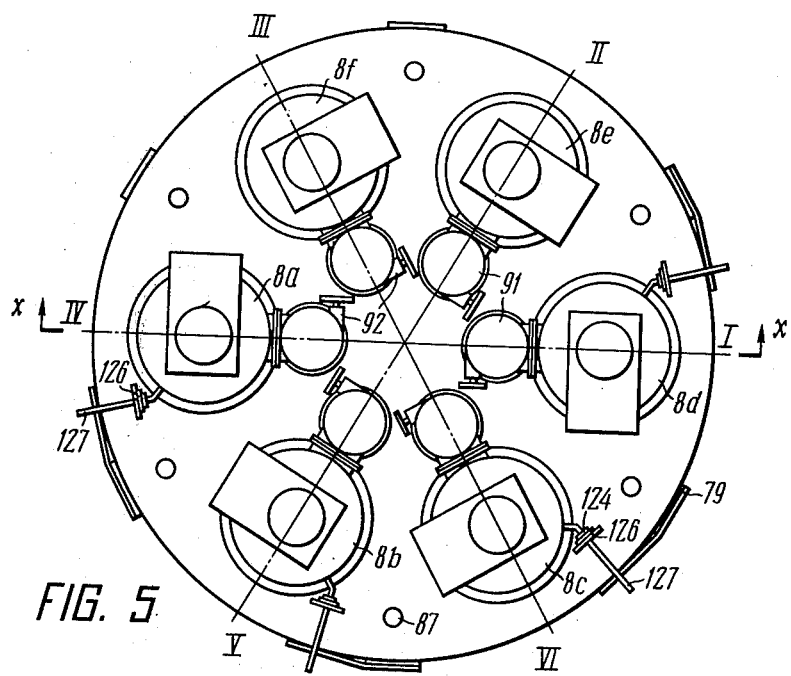
FIG. 5 is a plan view of the rotary table in an embodiment showing the chambers and vacuum pumps secured thereto.

In an embodiment of the invention shown in FIGS. 5 and 6, it is necessary to open the vacuum seal 92 which connects the mold chamber 8a to the vapor pump 91 of said chamber.

On closing the valve 37 of the mold chamber 8a, the valve 37 of the mold chamber 8f is opened to evacuate said chamber by means of the mechanical vacuum pump 31. After that the sequence of events is repeated as outlined above for the mold chamber 8a placed at D.

Next, the rotary table 9 is again turned and locked as described above with the result that the mold chamber 8a is moved to position F, the mold chamber 8f to E and the mold chamber 8e to D. Voltage is applied to the contactors 126 in proximity to position F which are in contact with the leads of the induction coil 124 of the mold chamber 8a when the rotary table 9 is in said position. The heating-up of the mold 7 is going on while the vapor pump 38 maintains a pressure of approximately $1 \times 10^{-3}$ mm Hg in the mold chamber 8a.

A mould 7 is placed into the mold chamber 8c in the same way as described above when a mold was placed into the mould chamber 8f at D.

Short of the last turn of the rotary table 9, the valve 18 is closed and the vacuum seal 22 opened, connecting the vapor pump 21 to the melting chamber 1. Also to be opened are the vacuum seals 29 and 30 which connect the vapor pumps 27 and 28 to the space inside the electron beam guns 2 and said space is evacuated. Before manipulating with the valves and seals, the heater 67 of the funnel 64 is turned on.

After the mould chamber 8a has shifted to position F, the operations connected with the melting of metal are started. The lid 72 is opened and the hopper 70 loaded with a charge taken in an amount sufficient to obtain the requisite amount of melt. After that the lid 72 is closed and the joint between the lid and the hopper 70 is rendered vacuum tight. The valve 74 is turned open, placing the hopper 72 in communication with the pump 31 through the line 73 and receiver 34, and, on evacuating the hoppr 72, the valve 74 is closed. The vacuum seal 71 of a construction similar to that of the seal 90 is opened and the charge from the hopper 70 enters the feeder 69, filling the screw. The vacuum seal 71 is closed and the screw is withdrawn so as to enable the charge to drop into the vessel 3. On completing the charging of the vessel 3, the telescopic screw is retracted into the feeder 69.

Immediately upon the closing of the vacuum seal 71, another batch of charge is loaded into the hopper 70 as described hereinabove. The electron beam guns 2 are set into operation and the charge is melted in the vessel 3, the process being watched through the inspection window 75 and monitored by means of the transducer 76 indicating the temperature of melt and other transducers supplying data to the instruments accommodated on the control desk 161.

Short of the instant the melt in the vessel 3 is ready for pouring, the rotary table 9 is turned again so that the mold chamber 8a is at A and the vacuum seal 11 of said chamber is disposed coaxially with the opening 4 of the melting chamber 1 closed by the vacuum seal 5. As a result of this turning of the table 9, the gear 96 fitted to the shaft 95 giving support to the base plate 94 of the mold chamber 8a engages the gear 97 of the drive 98.

The mold 7 contained in the mold chamber 8a continues being heated-up because the leads of its induction coil 124 are connected to the contactors arranged close to position A.

On turning the table 9, to be repeated as outlined above are all the operations connected with the placing of a mould 7 into the mould chamber 8d now at F and repeated are also all the operations with respect to the mould chambers 8e and 8f now at E and F, respectively.

Before pouring the metal from the vessel 3 into the mould 7 contained in the mould chamber 8a, a compressed fluid is admitted into the space limited by the flanges 58, 61 and bellows 59, 60 through the pipe 62. As a result, the sealing ring 63 is pressed against the vacuum seal 11 of the mould chamber 8a, separating from the atmosphere the seals 5 and 11, and the space therebetween. The valve 57 is opened, connecting said seals and space to the mechanical vacuum pump 31 through the line 56 and receiver 34. On evacuating the seals and space to approximately $1 \times 10^{-2}$ mm Hg, the valve 57 is closed. The vacuum seal 5 is opened in the same way as described above in connection with the seal 90, enabling the vapor pump 38 (91) to remove the remnant gases from the space between the seals 5, 11 and maintain a pressure of approximately $1 \times 10^{-3}$ mm Hg in the mould chamber 8a. Next, the vacuum seal 5 is opened and the funnel 64 is introduced into the melting chamber 1 through the hole 4, using the rack 65 and pinion 66 in mesh one with the other, so that the funnel 64 is disposed coaxially with the opening of the mold 7 and in close proximity to same. While the drive 98 serving the purpose of spinning the base plate 94 integrally with the mold 7 is turned on, the electron beam guns 2 and induction coil 124 are turned off, and a compressed fluid is applied to the actuating cylinder 47 causing its piston rod 48 to move upwards. The piston rod 48 in cooperation with the tie rod 49 turns the vessel 3 about the axis of the shaft 45 resting on the brackets 46. The metal contained in the vessel 3 is poured into the mold 7 through the funnel 64 and is distributed over the spaces in the mould on reaching same, forming a casting under the action of the centrifugal forces coming into play when the mold is being rotated.

After that the vessel 3 and tundish 64 are returned into the original position, the vacuum seals 11 and 5 are closed, and no compressed fluid is further admitted into the space between the bellows 59 and 60, the joint between said seals no longer being vacuum tight; the vacuum seal 90 of the mold chamber 8a is also closed and the drive 98 is turned off.

Next come all the operations connected with charging the vessel 3 and melting the metal as outlined hereinabove. Before the next melt is ready, the rotary table 9 is turned again so that the mold chamber 8f is at A prepared for pouring the mold 7. This is followed by the operations connected with closing the vacuum seals 5 and into in a vacuum tight fashion and pouring the metal into the mold in the same way as described above for the mold chamber 8a. After the turn of the rotary table 9, the mold chamber 8c arrives at D where a casting mold 7 is placed therein whereas the mold chamber 8a with a casting is at B, where the cooling of the casting goes on inside the space of the chamber closed vacuum tightly.

On pouring the metal into the casting mould 7 accommodated in the mold chamber 8*f* of the rotary table 9 is turned again so that the mold chamber 8*e* is moved to A and arriving at D is the last free mold chamber 8*b* loaded with a mould 7 at this position. The castings in the mold chambers 8*a* and 8*f* cool down at C and B, respectively.

As soon as the next batch of melt is ready in the vessel 3, poured is the mould 7 contained in the mold chamber 8*e* and then the table 9 is turned again so that arriving at A is the mold chamber 8*d* and the mold chambers 8*e* and 8*f* become stationed at B and C, respectively. The mould chamber 8*a* containing a ready casting comes at D whereas located at E and F are the mold chambers 8*b* and 8*c*, respectively, wherein the heating-up and degassing of the material of the molds 7 take place.

At D, the removable portion 105 of the mold chamber 8*a* is removed integrally with the base plate 94 and mold 7 secured thereto and containing a ready casting and transferred onto the rails 143 in the same sequence of events as described for the mould chamber 8*f*. The mould 7 with a casting is removed and taken to a station where the casting is withdrawn from the mould 7 and a new mould 7 is placed on the base plate 94. After that come the operations described above.

On pouring the metal into the mold contained in the mould chamber 8*d*, the rotary table 9 is turned so that at A is the mould chamber 8*c* and at D, the mould chamber 8*f* where the mould with a ready casting is removed from, and a new mould is placed into, the chamber as this was described above for the mould chamber 8*a*. After that the casting cycle of the machine is repeated.

Thus, each of the casting molds 7 is loaded into the respective mold chamber 8 at D and it is at this position and positions E and F where each mold is heated-up and degasses in a vacuum. This operation lasts approximately as long as the time of three sucessive meltings in the vessel 3 less the period elapsed in loading a new mold 7 at D and accounts for about an hour and a half. After that the metal is being poured in the mold 7 at A and then the casting is cooled down at A, B and C for about 2 hours.

In the vacuum casting machine disclosed, the six-mold rotary table 9 enables the operations of preparing each of the moulds 7 and cooling the castings to be carried out simultaneously with the melting in the melting chamber 1. The result is that the period during which each successive casting can be produced under the conditions of steady operation of the machine is controlled only by the time elapsed in melting a charge in the melting chamber 1. This time amounting to some 30 to 40 minutes a considerable increase in the production rate is obtainable.

We claim:

1. A vacuum casting machine comprising
a melting chamber with an opening for pouring metal;
a vessel for melting metal disposed in said melting chamber;
heaters for melting metal disposed in said melting chamber;
a first vacuum seal closing said opening for pouring metal;
a plurality of casting molds for receiving the melted metal;
a plurality of mold chambers each having one casting mold disposed therein, each mold chamber having a mold chamber opening for pouring the metal into its casting mold;
a plurality of second vacuum seals, each of said mold chambers having one of said second vacuum seals for closing the mold chamber opening for pouring the metal into its casting mold;
a rotary table accommodating around its circumference said plurality of mold chambers with associated molds;
a self-contained drive of said rotary table operatively associated with said rotary table, said rotary table serving the purpose of registering, in turning, each of the mold chamber openings for pouring metal in said mold chambers containing the molds with said opening for pouring metal in said melting chamber;
a vacuum sealing means serving to couple said first vacuum seal with each of said second vacuum seals in a vacuum-tight fashion during the process of pouring the metal into said casting molds;
a system for evacuating said melting chamber and associated mold chamber with mold;
an additional vacuum system disposed away from said rotary table for evacuating said mold chambers prior to connection with said melting chamber;
a sealed rotatable connecting means for connecting said additional vacuum system to all of said mold chambers on said rotary table, and
a support means for supporting said melting chamber and said rotary table.

2. The machine as claimed in claim 1, wherein each of said mold chambers additionally comprises a base plate rigidly securing said mold;
a shaft extending downwardly from the center of said base plate beyond said mold chamber; and
a stationary drive operatively associated with said shaft for rotating said base plate thereby enabling centrifugal casting to be accomplished with said machine.

3. The machine as claimed in claim 2, wherein each of said mold chambers additionally comprises an upper portion and a lower portion, said lower portion containing said base plate and being separable from said upper portion at a plane close to said base plate; and said rotary table being provided with an opening through which said lower portion of said mold chamber can be moved.

4. The machine as claimed in claim 3, wherein said lower portion is provided with rollers; said support means comprises circular rails disposed in a plane parallel to said rotary table concentrically with the axis of said rotary table; said rollers of said lower portion being adapted to ride on said circular rails; said circular rails having a section thereof being adapted to being separable from said support means and lowerable in a vertical direction.

5. The machine as claimed in claim 1 wherein each of the mold chambers containing a mold is provided with a second opening accomodating a third vacuum seal coupling the chamber to a vacuum pump additionally provided on the rotary table.

6. The machine as claimed in claim 5 wherein said sealed rotatable connecting means additionally connects said additional vacuum system to said vacuum pump on said rotary table.

* * * * *